US008573532B2

(12) United States Patent  
Lecordix et al.

(10) Patent No.: US 8,573,532 B2  
(45) Date of Patent: Nov. 5, 2013

(54) AIRCRAFT WITH RECIPROCATING ENGINES PARTIALLY EMBEDDED IN THE FUSELAGE

(75) Inventors: Jean-Loic Herve Lecordix, Blandy les Tours (FR); Marc Patrick Tesniere, Champcueil (FR); Stephane Jacques Francois Thomas, Coubert (FR)

(73) Assignee: Snecma, Paris (FR)

(*) Notice: Subject to any disclaimer, the term of this patent is extended or adjusted under 35 U.S.C. 154(b) by 393 days.

(21) Appl. No.: 12/582,262

(22) Filed: Oct. 20, 2009

(65) Prior Publication Data

US 2010/0096495 A1   Apr. 22, 2010

(30) Foreign Application Priority Data

Oct. 22, 2008   (FR) ...................... 08 05855

(51) Int. Cl.
*B64D 27/08* (2006.01)
(52) U.S. Cl.
USPC ................................ 244/54; 244/55; 244/119
(58) Field of Classification Search
USPC ................. 244/54, 55, 117 R, 119, 129.1
See application file for complete search history.

(56) References Cited

U.S. PATENT DOCUMENTS

| 1,790,988 | A | * | 2/1931 | Lalli ............................... 244/13 |
| 2,516,671 | A | * | 7/1950 | Wolf et al. ..................... 244/54 |
| 3,592,415 | A | * | 7/1971 | Walley et al. .................. 244/55 |
| 2005/0247043 | A1 | * | 11/2005 | Derenes et al. ............. 60/226.1 |

FOREIGN PATENT DOCUMENTS

| EP | 1 616 786 A1 | 1/2006 |
| GB | 1 463 810 | 2/1977 |

* cited by examiner

*Primary Examiner* — Joseph W Sanderson
*Assistant Examiner* — Brian M O'Hara
(74) *Attorney, Agent, or Firm* — Oblon, Spivak, McClelland, Maier & Neustadt, L.L.P.

(57) ABSTRACT

An aircraft provided with turbojet engines of which the nacelles are partially embedded in the fuselage of the aircraft is disclosed. The aircraft includes an internal space at engine nacelles. The internal space includes a platform capable of supporting personnel and maintenance equipment, with the portions of the nacelles located inside the aircraft comprising trapdoors or devices for accessing inside the engines from the platform.

9 Claims, 2 Drawing Sheets

AIRCRAFT WITH RECIPROCATING ENGINES PARTIALLY EMBEDDED IN THE FUSELAGE

BACKGROUND OF THE INVENTION

1. Field of the Invention

This invention relates to an aircraft provided with turbojet engines of which the nacelles are partially embedded (or buried) in the fuselage of the aircraft.

2. Description of the Related Art

The maintenance of aircraft requires regular intervention on their engines, comprising in particular verifications of fluid levels, visual inspections of indicators and of components of the engines, and replacing parts and accessories.

During maintenance operations, the covers of the engines are open, in such a way that the engines risk being in direct contact with dust, water or with various debris.

In addition, the operator carrying out these operations risks being exposure to inclement weather.

In the case of civil aircraft of which the engines are attached on the sides of the fuselage, the access for the operator to the engines requires the use of a raised mobile gateway or conveyor.

The guiding of this type of gateway has shown to be difficult and not very precise in such a way that impacts frequently occur between the gateway and a nacelle of an engine or the fuselage of the aircraft. This results in downtime of the aircraft, at the origin of considerable additional costs.

The use of a gateway of this type furthermore has risks of falling and injury for its user.

BRIEF SUMMARY OF THE INVENTION

The invention in particular has for purpose to provide a simple, economic and effective solution to these problems, making it possible to avoid the disadvantages of prior art.

It proposes for this purpose an aircraft provided with turbojet engines of which the nacelles are partially embedded in the fuselage of the aircraft, characterised in that it comprises on the engine nacelles an internal space comprising a platform capable of supporting personnel and maintenance equipment, with the portions of the nacelles located inside of the aircraft comprising trapdoors or means for accessing inside the engines from the platform.

The invention takes advantage of the partial embedding of the engine nacelles of the aircraft to offer an access to the engines from the platform inside the aircraft.

This makes it possible to avoid recourse to a mobile gateway for maintenance operations of the engines, and therefore the inherent risks in using this type of gateway, for the fuselage of the aircraft and the nacelles of its engines as well as for the safety of the maintenance personnel.

In addition, the means for accessing the engines and the maintenance operators are located sheltered from inclement weather and relatively isolated from dust and other debris.

According to another characteristic of the invention, the platform is borne by a floor of the aircraft.

This is for example the floor of the cabin of the aircraft, or any other adequate pre-existing floor, in such a way as to minimise the prior work of adapting the aircraft required for the mounting and the support of the platform inside the aircraft.

The platform extends more preferably from one engine to the other inside the aircraft, in such a way as to maximise the surface that can be used for supporting personnel and maintenance equipment and in order to allow the maintenance personnel to approach the engines as close as possible.

Advantageously, certain portions of the engines located inside the aircraft are devoid of protective covers, in such a way as to best facilitate access to the inside of the engine.

Indeed, the portions of the engines located inside the aircraft are protected from inclement weather and dust, and do not require to be faired by covers.

Each engine comprises more preferably at least one external casing of which a portion located inside the aircraft carries equipment that can be replaced during a stop-over, comprising for example at least one element such as a calculator, an electrical lead, an ignition exciter box, a lubricating module, a speed sensor, an oil tank, and/or a starter.

The equipment that can be replaced during a stop-over, commonly designated by the acronym LRU (Line-Replaceable Unit), is equipment that is designed in the form of modules in order to be replaced quickly and easily, for example when the aircraft is parked at an airport.

In conventional civil aircrafts of which the engines are attached to the sides of the fuselage using pylons, an external casing of each engine carried in general equipment of this type arranged on a portion of the surface of the casing opposite the fuselage in such a way that this equipment can be accessed by maintenance personnel from a mobile gateway, after opening the casing panel covering this portion of the aforementioned casing.

Within the framework of the invention, the arrangement of such equipment on a portion of an external casing of the engine located inside the aircraft allows for easy access to this equipment from the internal platform of the aircraft.

Generally, the invention makes it possible to facilitate the maintenance operations and to reduce the downtime of the aircraft for the execution of these operations.

BRIEF DESCRIPTION OF THE SEVERAL VIEWS OF THE DRAWINGS

The invention shall be better understood and other details, advantages and characteristics of the latter shall appear more clearly when reading the following description provided by way of a non-limiting example, in reference to the annexed drawings wherein.

DETAILED DESCRIPTION OF THE INVENTION

Figure 1:
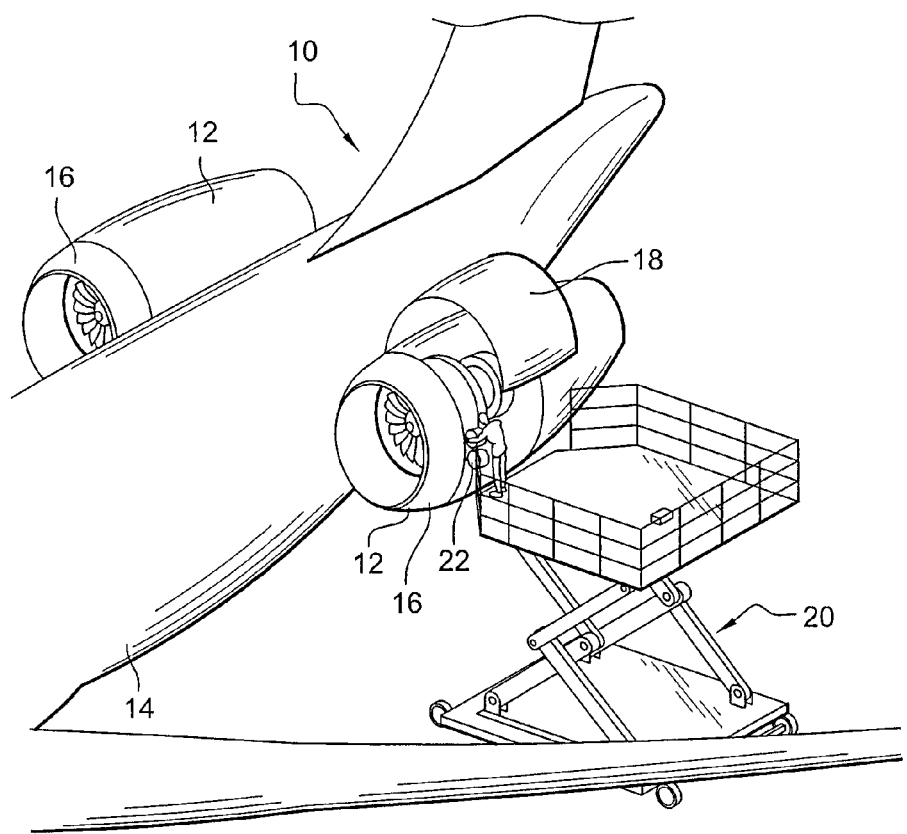
FIG. 1 is a partial schematic view in perspective of a civil aircraft of known type.

FIG. 1 shows a rear portion of a civil aircraft 10 provided with two turbojet engines 12 mounted laterally on the fuselage 14 of the aircraft.

Each engine is incorporated into a nacelle 16 comprising removable covers 18 and connected to the fuselage 14 using a pylon (not shown in FIG. 1).

FIG. 1 schematically shows the aircraft parked on the ground during a stop-over, and a maintenance agent standing on a mobile gateway 20 and carrying out maintenance operations on the left engine of the aircraft, of which a cover 18 of the nacelle 16 is in an open position in such a way as to allow access to the equipment that can be replaced during a stop-over (LRU) 22.

This type of configuration expose the engines to the inclement weather and to the dust and has risks of impacts between the mobile gateway 20 on the one hand and the nacelles 16 of the engines and the fuselage 14 of the aircraft on the other hand, as well as risks for the safety of the personnel on board of the mobile gateway 20.

Figure 2:
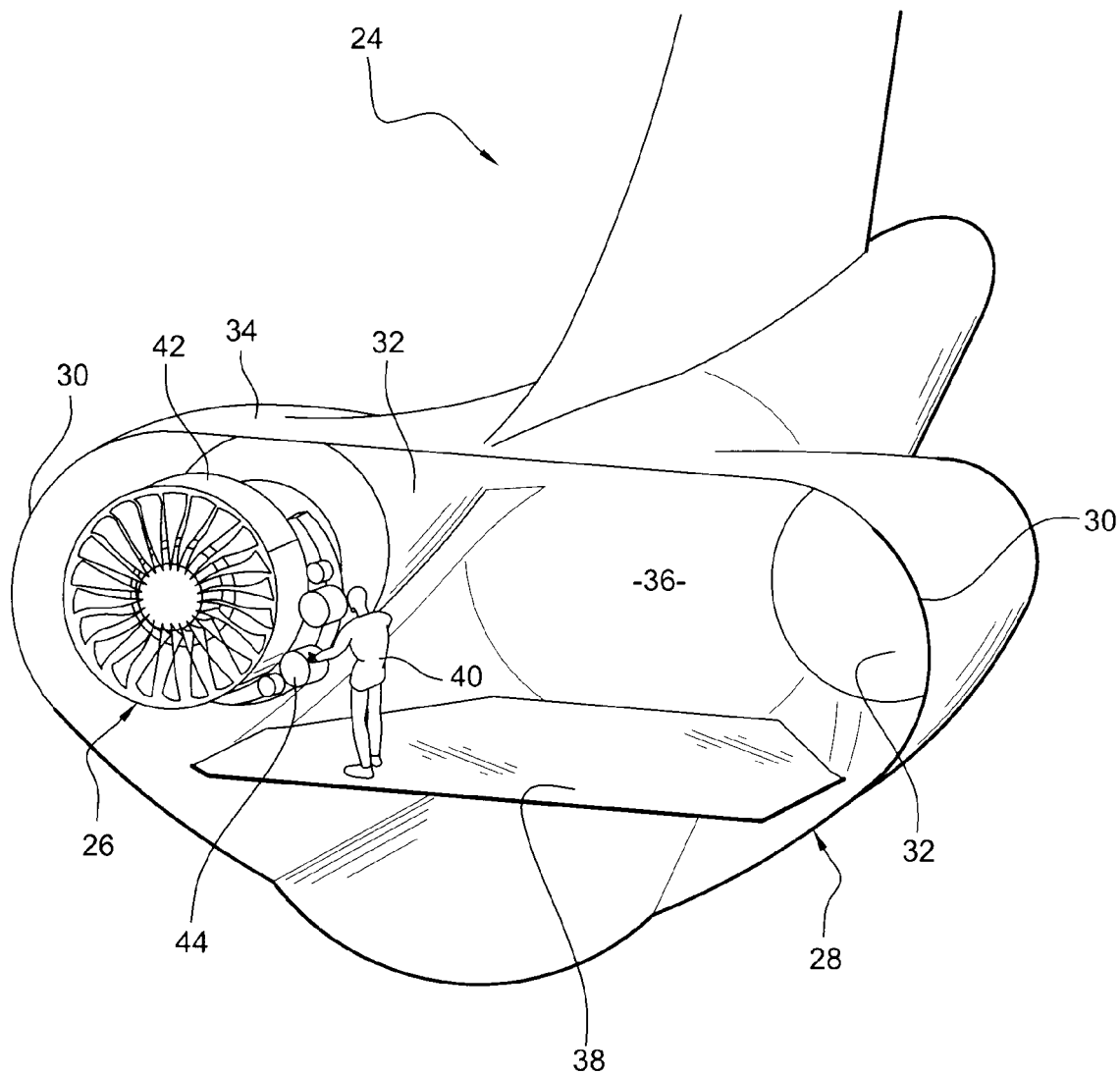
FIG. 2 is a partial cross-section schematic view and in perspective of a rear portion of a civil aircraft according to the invention.

FIG. 2 shows a civil aircraft 24 with a configuration sometimes referred to as "buried engines", wherein the engines 26 of the aircraft (of which only the right engine is shown in FIG. 2) are not connected to the fuselage 28 of the aircraft by respective pylons but are housed respectively in two lateral nacelles 30 partially embedded in the fuselage itself of the aircraft 24 and are borne by means of support 32 arranged in the inside of this fuselage.

For this, the fuselage 28 comprises an enlarged rear portion 34 of each side of the aircraft, in such a way as to form the two lateral nacelles 30 intended for the fairing of the engines 26 of the aircraft.

According to the invention, the enlarged rear portion 34 of the fuselage delimits an internal space 36 wherein are housed the engines 26, and the aircraft comprises a platform 38 able to support the personnel 40 and maintenance equipment, this platform 38 extending from an engine 26 to the other inside the internal space 36.

The platform 38 can for example be carried by a floor of the aircraft. This platform is arranged at a height that is less, for example by approximately 1.50 metres, than that of the respective axes of the engines 26, inside the internal space 36, in such a way that a maintenance agent standing on this platform 38 can access the engines 26.

In order to best facilitate the maintenance operations, an intermediary casing 42 on each of the engines 26 carries equipment that can be replaced during a stop-over (LRU) 44 arranged on a portion of its external surface located inside the aircraft and devoid of protective covers.

As such, the equipment 44 can be accessed from the platform 38 without the maintenance personnel 40 having to remove protective covers.

From a general standpoint, the invention makes it possible to reduce the duration of the interventions concerning the maintenance of aircraft engines by a factor from 3 to 5, while improving safety during these interventions, for the aircraft as well as for the maintenance personnel.

The invention claimed is:

1. An aircraft provided with at least two turbojet engines comprising:
nacelles partially embedded in a fuselage of the aircraft,
wherein the aircraft comprises an internal space delimited by an enlarged rear portion of the fuselage of each side of the aircraft, the enlarged rear portion being aft of a wing of the aircraft and wider than an upstream portion of the fuselage and forming the engine nacelles and the engines are disposed in the internal space, the internal space comprising a platform capable of supporting personnel and maintenance equipment, with portions of the nacelles located inside the aircraft comprising trapdoors or means for accessing inside both of the engines from the platform, and
wherein the enlarged rear portion of the fuselage forming the engine nacelles further comprises at an upstream end air inlet openings facing upstream for feeding the turbojets with air from outside of the aircraft.

2. The aircraft according to claim 1, wherein the platform is carried by a floor of the aircraft.

3. The aircraft according to claim 2, wherein the platform extends from one engine to another engine inside the aircraft.

4. The aircraft according to claim 1, wherein certain portions of the engines located inside the aircraft are devoid of protective covers.

5. The aircraft according to claim 1, wherein each engine comprises at least one casing surrounding the engine, the casing having a portion located inside the aircraft carrying equipment that can be replaced during a stop-over.

6. The aircraft according to claim 5, wherein the equipment that can be replaced during a stop-over includes at least one element among a calculator, an electrical lead, an ignition exciter box, a lubricating module, a speed sensor, an oil tank, and a starter.

7. The aircraft according to claim 1, wherein the platform is disposed below axes of the engines.

8. The aircraft according to claim 1, wherein the engines are not connected to the fuselage by pylons.

9. The aircraft according to claim 1, wherein the enlarged rear portion of the fuselage forming the engine nacelles further comprises outlet openings downstream of the engines for ejecting air from the engines to the outside of the aircraft.

* * * * *